United States Patent [19]

Dumbaugh

[11] 4,052,849
[45] Oct. 11, 1977

[54] MECHANICAL WORK GENERATING MEANS

[75] Inventor: George D. Dumbaugh, Louisville, Ky.

[73] Assignee: Vibranetics, Inc., Louisville, Ky.

[21] Appl. No.: 623,735

[22] Filed: Oct. 20, 1975

[51] Int. Cl.² .................................. F03B 17/00
[52] U.S. Cl. ........................ 60/325; 290/1 R; 74/87; 417/472; 417/412; 60/721
[58] Field of Search ............ 290/1, 4; 417/412, 472, 417/483; 74/87; 198/762; 60/235, 721

[56] References Cited
U.S. PATENT DOCUMENTS

| 1,739,944 | 12/1929 | Braselton et al. | 417/472 |
| 1,742,183 | 1/1930 | Bell | 417/472 |
| 2,917,751 | 12/1959 | Fry et al. | 417/473 |
| 3,545,894 | 12/1970 | Lovitz | 417/412 |

FOREIGN PATENT DOCUMENTS 528,113   4/1954   Belgium .................... 417/410

Primary Examiner—Robert K. Schaefer
Assistant Examiner—J. W. Redman
Attorney, Agent, or Firm—Harry B. O'Donnell, III

[57] ABSTRACT

This invention provides novel mechanical work generating means. Basically, the novel mechanical work generating means provided by the present invention comprise: first means for mechanically generating a heat component of work; second means, mechanically interconnected to the first means, for mechanically generating a non-heat component of work; and third means, mechanically interconnected to the first and second means, for combining the heat and non-heat components of work into a resultant mechanical work output.

9 Claims, 9 Drawing Figures

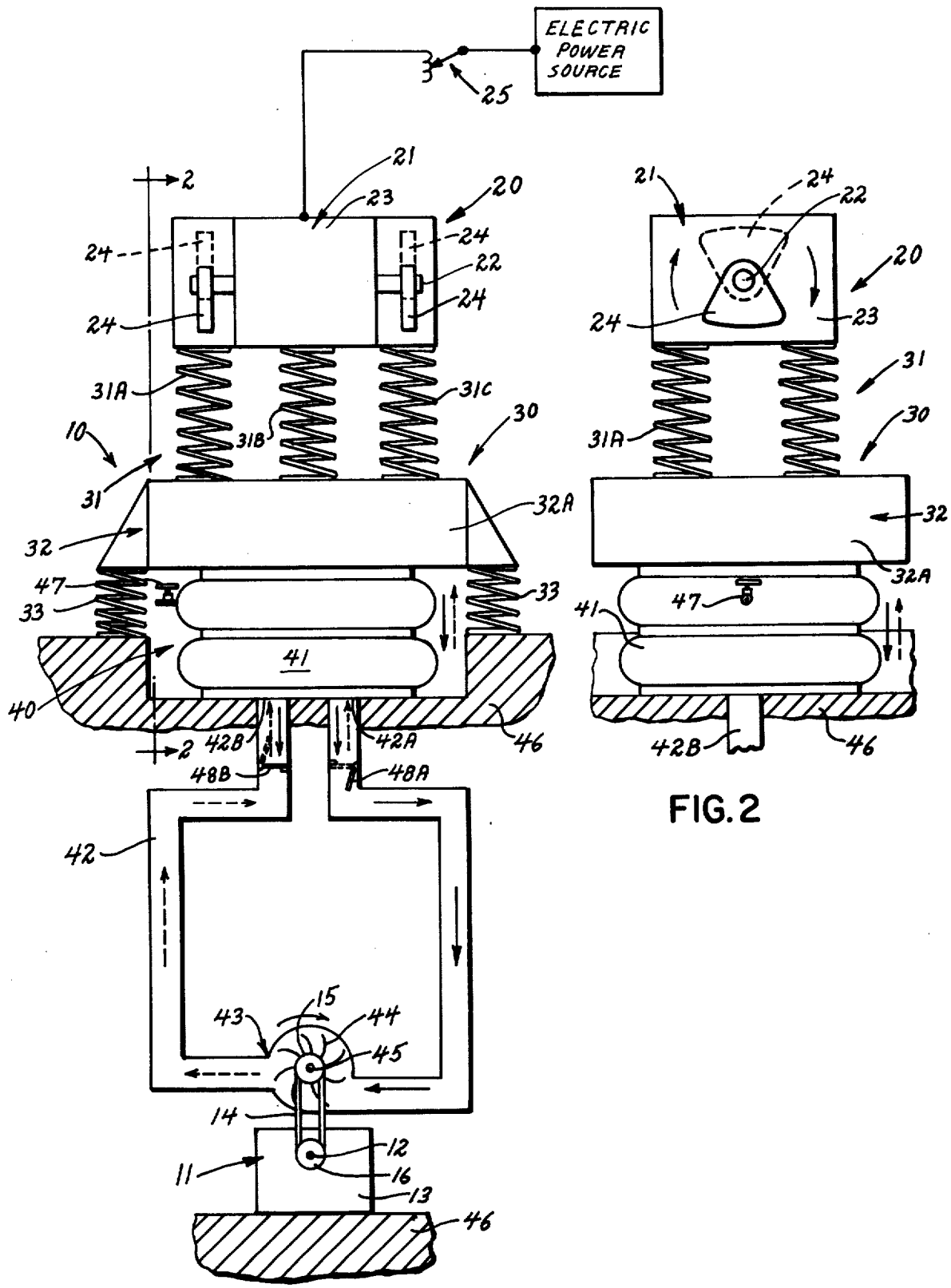

PRIOR-ART

MECHANICAL WORK GENERATING MEANS

BACKGROUND OF THE INVENTION

This invention relates to means for generating mechanical work and, more particularly, to means for generating the mechanical work required to drive a load, which are commonly referred to as "prime movers" or "drives."

Heretofore, the conventional means for generating the mechanical work required to drive a load (i.e. conventional "drives" or "prime movers," such as internal combustion motors and electrically-powered and fluid-powered motors, and the like) have been constructed such that a single means, which must mechanically generate both a heat component of work and a non-heat component of work to drive the load, has been directly mechanically interconnected to the load. And, as a result, a considerable portion of the work input to these old conventional mechanical work generating means has been consumed by the mechanical generation by them of the non-heat component of work to meet the mass inertia demands of the load.

However, I have found that the work input consumption, which was inherently high in the aforedescribed old conventional "drives" or "prime movers," can be greatly reduced by employing the novel mechanical work generating means that are provided in accordance with the present invention.

SUMMARY OF THE INVENTION

The present invention provides novel mechanical work generating means. Basically, the novel mechanical work generating means provided by the present invention comprise: first means for mechanically generating a heat component of work; second means, mechanically interconnected to the first means, for mechanically generating a non-heat component of work; and third means, mechanically interconnected to the first and second means, for combining the heat and non-heat components of work into a resultant mechanical work output.

Preferably, the first means (i.e. the means for mechanically generating a heat component of work) comprises excitor means, such as a conventional "drive" or "prime mover" of the aforedescribed type, including internal combustion motors and electrically-powered and fluid-powered motors, and the like, that is provided with a rotary output shaft on which there are eccentrically mounted weights; the second means (i.e. the means for mechanically generating a non-heat component of work that is required to meet the mass inertia demands of the driven load) comprises yieldable means (such as spring means, bellows, and the like), that are tuned to be substantially at their natural vibratory frequency and inertia absorbing means; and the third means (i.e. the means for combining the heat and non-heat components of work into a resultant mechanical work output) comprises fluid containing pump means and there is action caused upon the fluid contained therein by the heat and non-heat components of mechanical work output and the pump means can further comprise turbine means having rotary means including a load-driving shaft that is rotated by the action upon the fluid.

BRIEF DESCRIPTION OF THE DRAWINGS

The present invention is illustrated in the accompanying drawings, wherein:

FIG. 1 is a fragmentary, somewhat schematic, elevational view, including an electrical wiring diagram, illustrating one presently preferred form of my present invention;

FIG. 2 is a fragmentary sectional view taken along line 2—2 of FIG. 1, with the wiring diagram omitted;

DETAILED DESCRIPTION

Figure 3A:
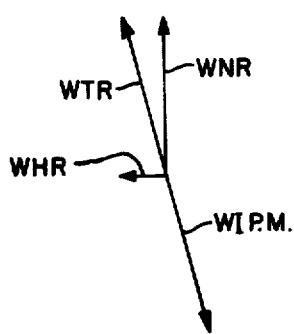
FIG. 3A - 3C are vector diagrams of a typical conventional prior-art form of a mechanical work generating means and vectorially illustrate the various relationships of the heat component of mechanical work and the non-heat component of mechanical work that are both developed during its operation by its single means and the resultant mechanical work output into which they are combined by its single means that is directly mechanically interconnected to the load that is to be driven by it.

Turning now to the drawings, and more particularly, to FIGS. 1 and 2 thereof, there is illustrated one presently preferred form of a novel mechanical work generating means 10 that is provided in accordance with my present invention to drive a load 11, which is illustrated in FIG. 1 as a rotatable input shaft 12 for a gear box 13, such as might be employed in a vehicle such as an automobile or the like (not shown).

As illustrated in FIGS. 1 and 2 of the drawings, the novel mechanical work generating means 10 of my present invention basically comprises; first means 20 for mechanically generating a heat component of work; second means 30, mechanically interconnected to the first means 20, for mechanically generating a non-heat component of work; and third means 40, mechanically interconnected to the first and second means 20 and 30, for combining the heat and non-heat components of work that are respectively generated by the first means 20 and the second means 30 into a resultant mechanical work output.

As further illustrated in FIGS. 1 and 2 of the drawings, the first means 20 (i.e. the means for mechanically generating the heat component of work) comprises excitor means 21, which, in the form shown, comprise an electrically powered motor that is provided with a rotary output shaft 22 which extends outwardly through openings provided in opposite ends of its housing 23 and has eccentrically mounted on each of the opposite ends of that shaft 22 a weight 24 and is provided with suitable adjustable control means 25, of a well-known construction, for selectively varying the rotational speed of the shaft 22. It should, however, be understood that other motors, including internal combustion motors and fluid-powered motors, and the like (not shown), might be substituted for the illustrated electrically-powered motor to provide the excitor means 21 of the first means 20.

As still further shown in FIGS. 1 and 2 of the drawings, the second means 30 (i.e. the means for mechanically generating the non-heat component of work that is required to meet the mass inertia demands of the driven load 11) comprises yieldable means 31, which, in the form shown, comprise a plurality of springs 31A, 31B and 31C, that are tuned to be substantially at their natural vibratory frequency, and inertia absorbing means 32, while the third means 40 (i.e. the means for combining the heat and non-heat components of work that are respectively mechanically generated by the first means 20 and the second means 30 into a resultant mechanical work output) comprises fluid-containing pump means, such as the illustrated bellows 41 with piping loop 42 fluid-connected thereto that has mounted within it turbine means 43 having rotary means 44 including a load-driving shaft 45 that is rotated by action upon the fluid and which is mechanically interconnected, as by the illustrated belt 14 and pulleys 15 and 16 to the rotatable input shaft 12 for the load 11.

In the form of my present invention illustrated in FIGS. 1 and 2, the pump means bellows 41 of the third means has its lower end attached to base means 46, such as the frame of a vehicle (not shown) that also supports the load 11. The bellows 41 of the third means 40 is imperforate, except for a pair of spaced-apart openings in its lower end which are respectively connected to the inlet 42A and outlet 42B ends of the piping loop 42 of the third means 40 and a valved opening 47 that is provided adjacent its upper end for admitting or removing fluid to or from it and the piping loop 42 of the third means 40. And, the inertia absorbing means 32 comprises an inertia absorbing member 32A that is mechanically interconnected between the top end of the bellows 41 of the third means 40 and the bottom ends of the natural-frequency tuned springs 31A, 31B and 31C which comprise the yieldable means 31 of the second means 30 and, in turn, have their upper ends mechanically interconnected to the housing 23 of the electrically-powered motor that comprises the first means 20, such that the axis of the shaft 22 of that motor is arranged generally horizontally as shown in FIGS. 1 and 2 of the drawings.

As still further shown in FIGS. 1 and 2 of the drawings, isolating springs 33 are provided between the inertia absorbing member 32A of the second means 30 and the base means 46. And, check valves 48A and 48B are respectively mounted within the piping loop 42 of the third means 40 adjacent to its inlet 42A and outlet 42B ends between the turbine means 43 and the bellows 41 of the third means 40 such that energization of the excitor means motor 21 of the first means 20 to cause rotation of its shaft 22 which eccentrically mounts the weights 24 in the direction shown by the solid arrows will cause the fluid contained within the bellows 41 and the piping loop 42 to be acted upon by the heat and non-heat components of work that are respectively mechanically generated by the first 20 and second 30 means and to be pumped in the direction shown by the solid line arrows when the weights 24 are rotated into the positions shown in solid lines and in the direction shown by the shadow line arrows when the weights 24 are rotated into the positions shown in shadow lines. Concurrently with this, the bellows 41 of the third means 40 will be compressed and moved in the direction shown by the solid line arrow adjacent to it when the weights 24 are rotated into the positions shown in solid lines and will be expanded and moved in the direction shown in shadow line arrows adjacent thereto when the weights 24 are in the positions shown in shadow lines. With this arrangement, the load-driving shaft 45 of the rotary means 44 of the turbine means 43 of the third means 40 will be rotated in the direction indicated by the solid line arrow shown adjacent thereto in FIG. 1 of the drawings, as will be the rotation of the input shaft 12 of the load 11 which is mechanically interconnected thereto by the illustrated belt 14 and pulleys 15 and 16. And, the work input that is delivered to the load 11 that is driven by the form of my novel means for generating mechanical work 10 that is illustrated in FIGS. 1 and 2 of the drawings can be selectively varied by selectively varying the rotational speed of the rotary output shaft 22 of the excitor means motor 21 which eccentrically mounts the weights 24 through operation of the adjustable control means 25 that are provided therefor.

Turning now to FIGS. 3A - 3C and 4A - 4C of the drawings, there is graphically illustrated therein the great reduction in the amount of work input consumption that can be afforded to the excitor means 21, such as a conventional "drive" or "prime mover" which I utilize for the first means 20 thereof when employing the novel form of the work generating means 10 that is illustrated in drawing FIGS. 1 and 2 wherein such an excitor means motor 21 is mechanically connected to the load 11 with second 30 and third 40 means as described in detail above, rather than being directly mechanically connected to the load.

As vectorially illustrated in each of FIGS. 3A - 3C and 4A - 4C, the load that is to be driven requires a total amount of mechanical work (WTR) which is the vectorial resultant of two basic components of mechanical work, to drive it. These include a heat component of mechanical work (WHR) that is required to overcome the heat losses, e.g. the frictional losses generated by the movement of the load, and a non-heat component of mechanical work (WNR) that is approximately four times as great as the heat component of mechanical work input and is required to overcome the mass inertia of the load, as during acceleration thereof.

Figure 3B:
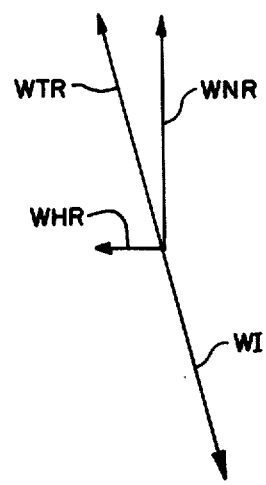
Figure 3C:
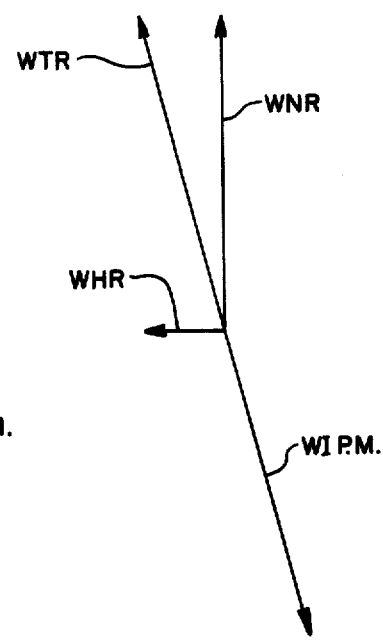

FIGS. 3A - 3C respectively vectorially illustrate three different operating conditions of mechanical work load requirements (low, medium and high) of a load that is being driven by a conventional prior-art mechanical work generating means wherein a conventional "drive" or "prime mover" has been directly mechanically connected to the load and, hence, must mechanically generate both the heat component of work and the non-heat component of work that are required to drive the load, with the total mechanical work input that must be supplied to the "drive" or "prime mover" being shown as a resultant mechanical work input vector WIP.M.) which is equal to the square root of the sum of the squares of these two components.

Figure 4A:
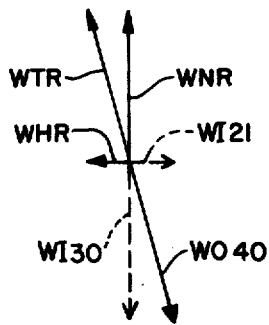
FIGS. 4A - 4C are vector diagrams of the form of my present invention shown in FIGS. 1 and 2 and vectorially illustrate the various relationships of the heat component of mechanical work and the non-heat component of mechanical work that are respectively developed during its operation by its mechanically interconnected first and second means and the resultant mechanical work output into which they are combined by its third means that is mechanically interconnected to its first and second means.
Figure 4B:
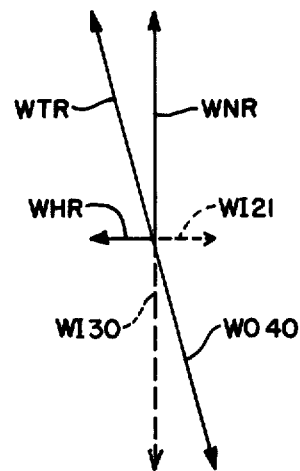
Figure 4C:
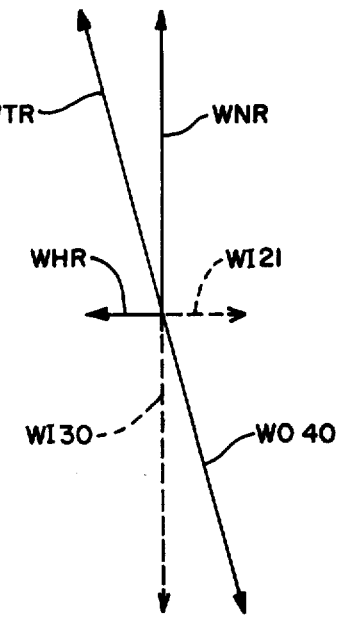

FIGS. 4A - 4C respectively vectorially illustrate three different operating conditions or mechanical work requirements (low, medium and high) of a load that is being driven by the form of the novel mechanical work generating means 10 of my present invention shown in FIGS. 1 and 2, wherein the "drive" or "prime mover" which I employ for the excitor means motor 21 of its first means 20 must generate only the heat component of the work that is required to drive the load while the much greater non-heat component of the mechanical work that is required to drive the load is generated by its second means 30 which includes the natural frequency-tuned yieldable means 31, and vectorially show the work input to the excitor means motor (WI21), the work input supplied by the second means (WI30), and the resultant mechanical work output (WO40) into which these latter two are combined by the third means 40.

Figure 5:
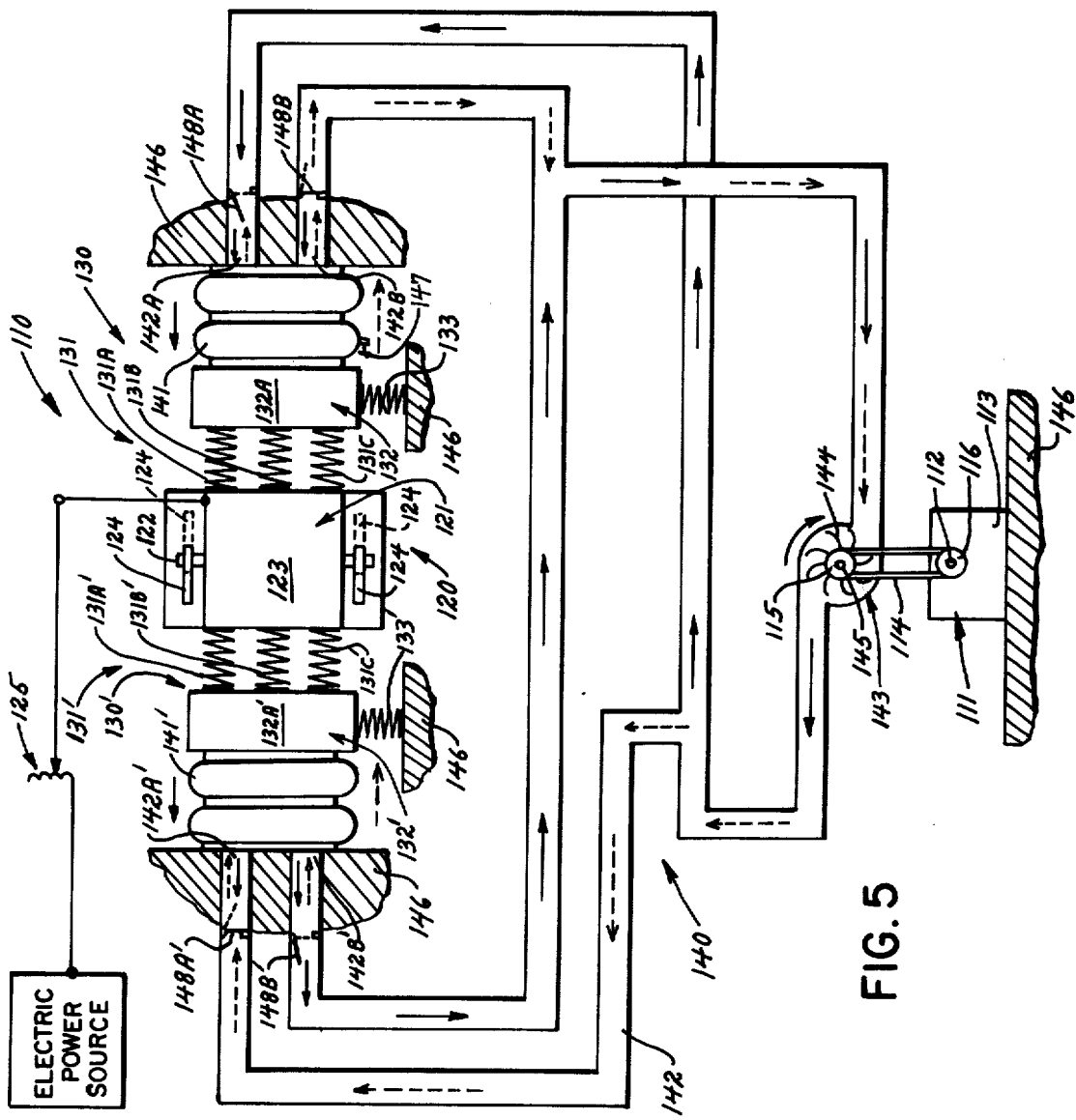
FIG. 5 is a view similar to FIG. 1 but illustrating an alternative form of my present invention.

FIG. 5 is a view similar to FIG. 1, but illustrating an alternative form of a novel mechanical work generating means 110 that is provided in accordnce with my present invention to drive a load 111, which is illustrated in FIG. 5 as a rotatable input shaft 112 for a gear box 113, such as might be employed ina vehicle such as an automobile or the like (not shown).

As illustrated in FIG. 5 of the drawings, the novel mechanical work generating means 110 basically comprises: first means 120 for mechanically generating a heat component of work; second means 130 and 130', mechanically interconnected to the first means 120, for mechanically generating a non-heat component of work; and third means 140, mechanically interconnected to the first 120 and second 130 and 130' means, for combining the heat and non-heat components of work that are respectively mechanically generated by the first means 120 and the second means 130 and 130' into a resultant mechanical work output.

As further illustrated in FIG. 5 of the drawings, the first means 120 (i.e. the means for mechanically generating the heat component of work) comprises excitor means 121, which, in the form shown, comprise a single electrically powered motor that is provided with a rotary output shaft 122 which extends outwardly through openings provided in opposite ends of its housing 123 and has eccentrically mounted on each of the opposite ends of that shaft a weight 24 and is provided with suitable adjustable control means 125, of a well-known construction, for selectively varying the rotational speed of the shaft 122. It should, however, be understood that other motors, including internal combustion motors and fluid-powered motors, and the like (not shown), might be substituted for the illustrated electrically-powered motor to provide the excitor means 121 of the first means 120.

As still further shown in FIG. 5 of the drawings, the second means 130 and 130' (i.e. the means for mechanically generating the non-heat component of work that is required to meet the mass inertia demands of the driven load 111) comprises yieldable means 131 and 131' which, in the form shown, comprise two sets of plural springs 131A, 131B and 131C and 131A', 131B' and 131C', that are tuned to be substantially at their natural vibratory frequency, while the third means 140 (i.e. the means for combining the heat and non-heat components of work that are respectively mechanically generated by the first means 120 and the second means 130 and 130') comprises fluid-containing pump means such as the illustrated two bellows 141 and 141' with piping loop 142 fluid-connected thereto that has mounted within it turbine means 143 having rotary means 144 including a load-driving shaft 145 that is rotated by action upon the fluid and which is mechanically interconnected by the illustrated belt 114 and pulleys 115 and 116 to the rotatable input shaft 112 for the load 111.

In the form of my present invention illustrated in FIG. 5, the one of the pump means bellows 141 of the third means 140 has one of is ends attached to base means 146, such as the frame of a vehicle (not shown) that also supports the load 111. This one bellows 141 of the third means 140 is imperforate, except for a pair of spaced-apart openings in the end thereof that is attached to the base means 146 which are respectively connected to openings 142A and 142B in the piping lop 142 of the third means 140 and a valved opening 147 that is provided in its sidewall adjacent to its opposite end for admitting or receiving fluid to or from it and the piping loop 142 of the third means 140. And, the inertia absorbing means 132 comprises first inertia absorbing means 132A' which is mechanically interconnected between the imperforate end of the bellows 141 of the third means 140 and the ends of the first set of natural frequency-tuned springs 131A, 131B and 131C, that comprise the yieldable means 131 of the second means 130 and, in turn, have their opposite ends mechanically interconnected to the housing 123 of the single excitor means motor 121 that is provided for the first means 120, such that the axis of the shaft 122 of that motor 121 is arranged generally vertically as shown in FIG. 5 of the drawings. The other pump means bellows 141' of the third means 140 also has one of its ends attached to the base means 146. This other bellows 141' is also imperforate, except for a pair of spaced-apart openings in its end that is attached to the base means 146 which are respectively connected to two other openings 142A' and 142B' in the piping loop 142 of the third means 140. And, the other inertia absorbing means 132' comprises another inertia absorbing member 132A' that is mechanically interconnected between the imperforate end of the other bellows 141' of the third means 140 and the ends of the other set of the natrual frequency-tuned springs 131A', 131B' and 131C' which comprise the yieldable means 131' of the second means 130' and, in turn, have their opposite ends mechanically interconnected to the side of the housing 123 of the single excitor means motor 121 which is diametrically opposite from that which is mechanically interconnected to the first set of natural frequency-tuned springs 131A, 131B and 131C.

As still further shown in FIG. 5 of the drawings, isolating springs 133 and 133' are respectively provided between the two inertia absorbing members 132A and 132A' of the second means 130 and 130' and the base means 146. And, check valves 148A and 148B are respectively mounted within the piping loop 142 of the third means 140 adjacent to its openings 142A and 142B between the turbine means 143 and the first bellows 141 of the third means 140, while check valves 148A' and 148B' are respectively mounted within the piping loop 142 of the third means 140 adjacent to its openings 142A' and 142B' between the turbine means 143 and the second bellows 141' of the third means 140 such that energization of the single excitor means motor 121 of the first means 120 to cause rotation of its shaft which eccentrically mounts the weights 124 will cause the fluid contained within the two bellows 141 and 141' and the piping loop 142 of the third means 140 to be acted upon by the heat and non-heat components of work that are respectively mechanically generated by the first 120 and the second 130 and 130' means to be pumped in the direction shown by the solid line arrows when the weights 124 are rotated into the position shown in solid lines and in the direction shown by the shadow line arrows when the weights 124 are rotated into the positions shown in shadow lines.

Concurrently with this, when the weights 124 are rotated into the position shown in solid lines, the two bellows 141 and 141' will be moved in the direction shown by the solid line arrows adjacent thereto with one of those bellows 141' being compressed while the other bellows 141 is simultaneously being expanded, and when the weights 124 are rotated into the position shown in shadow lines, the two bellows 141 and 141' of the third means 140 will then be moved in the direction shown by the shadow line arrows adjacent thereto, with the bellows 141 then being compressed while the other bellows 141' is simultaneously then being expanded. With this arrangement, the load-driving shaft 145 of the rotary means 144 of the turbine means 143 of the third means 140 will be rotated in the direction indicated by the solid line arrow shown adjacent thereto in FIG. 5 of the drawings, as will be the rotation of the input shaft 112 of the load 111 which is mechanically interconnected thereto by the illustrated belt 114 and pulleys 115 and 116. And, the work input that is delivered to the load 111 that is driven by the form of my novel means for generating mechanical work 110 that is illustrated in FIG. 5 of the drawings can be selectively varied by selectively varying the rotational speed of the rotary output shaft 122 of the single excitor means motor 121 which eccentrically mounts the weights 124 through operation of the adjustable control means 125 that are provided therefor.

It should be apparent that while there have been described herein what are presently considered to be presently preferred embodiments of the present invention in accordance with the Patent Statutes, changes may be made in the disclosed apparatus without departing from the true spirit and scope of this invention. It is, therefore, intended that the appended claims shall cover such modifications and applications that may not depart from the true spirit and scope of this present invention.

What is claimed is:

1. Mechanical work generating means, comprising:
   a. first means for mechanically generating a heat component of work including excitor means provided with rotatable eccentrically-mounted weights;
   b. second means, mechanically interconnected to said first means, for mechanically generating a non-heat component of work comprising yieldable means that are tuned to be substantially at their natural vibratory frequency and inertia absorbing means; and
   c. third means, mechanically interconnected to said first and second means, for combining said heat and non-heat components of work into a resultant mechanical work output,
   d. said third means comprising fluid-containing pump means and there being action caused upon the fluid contained therein by said heat and non-heat components of work.

2. The invention of claim 1, wherein said pump means further comprises turbine means having rotary means including a load driving shaft that is rotated by said action upon said fluid.

3. The invention of claim 2, wherein said inertia absorbing means comprises an inertia absorbing member that is mechanically interconnected between said yieldable means and said third means.

4. The invention of claim 1, wherein said inertia absorbing means comprises an inertia absorbing member that is mechanically interconnected between said yieldable means and said third means.

5. The invention of claim 1, wherein said excitor means comprises motor means having a rotary output shaft on which said weights are eccentrically mounted.

6. The invention of claim 5, wherein said yieldable means comprises spring means.

7. The invention of claim 1, wherein said yieldable means comprises spring means.

8. The invention of claim 6, wherein said motor means is provided with adjustable control means for selectively varying the rotational speed of said rotary output shaft.

9. The invention of claim 5, wherein said motor means is provided with adjustable control means for selectively varying the rotational speed of said rotary output shaft.

* * * * *